United States Patent

[11] 3,583,788

| [72] | Inventors | Walter W. Lee<br>Allendale;<br>Milton Genser, Short Hills, both of, N.J. |
|---|---|---|
| [21] | Appl. No. | 821,156 |
| [22] | Filed | May 1, 1969 |
| [45] | Patented | June 8, 1971 |
| [73] | Assignee | The Bendix Corporation<br>Continuation-in-part of application Ser. No. 706,566, Feb. 19, 1968, now abandoned. |

[54] DISPLAY DEVICE WITH UNIFORMLY DECREASING ELECTRIC FIELD
8 Claims, 6 Drawing Figs.

| [52] | U.S. Cl. | 350/160 |
|---|---|---|
| [51] | Int. Cl. | G02f 1/36 |
| [50] | Field of Search | 350/160, 161; 315/169 |

[56] References Cited
UNITED STATES PATENTS

| 2,942,131 | 6/1960 | Diemer et al. | 315/169X |
|---|---|---|---|
| 3,111,666 | 11/1963 | Wilmotte | 343/13 |
| 3,130,348 | 4/1964 | Lieb | 315/169X |
| 3,164,665 | 1/1965 | Stello | 350/160 |
| 3,271,578 | 9/1966 | Bockemuehl | 350/160 |
| 3,460,884 | 8/1969 | Heller | 350/160 |

*Primary Examiner*—Ronald L. Wibert
*Assistant Examiner*—V. P. McGraw
*Attorneys*—Ronald G. Gillespie and Plante, Hartz, Smith, and Thompson ABSTRACT: A display device having a layer of semiconductive material with an optical absorption band whose edge shifts in the presence of a strong electric field. The layer of semiconductive material is subjected to an electric field that uniformly decreases in strength in one direction along the layer of semiconductive material. The strength of the electric field is changed to control transmission of light by the layer of semiconductive material to provide a lighted display. The light has a wavelength related to the edge of the optical absorption band of the semiconductive material.

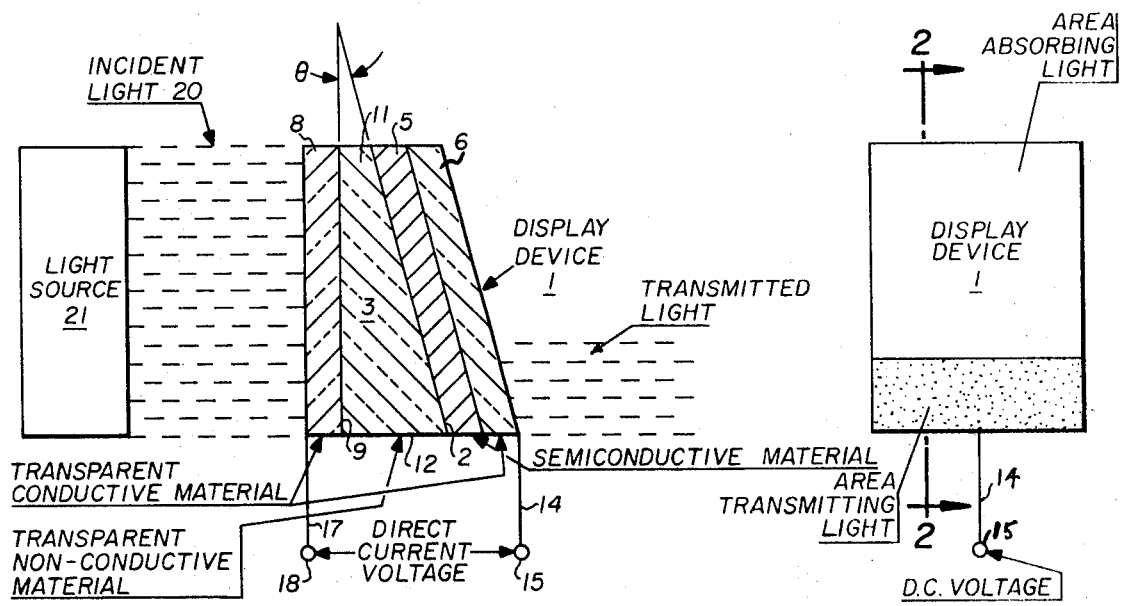
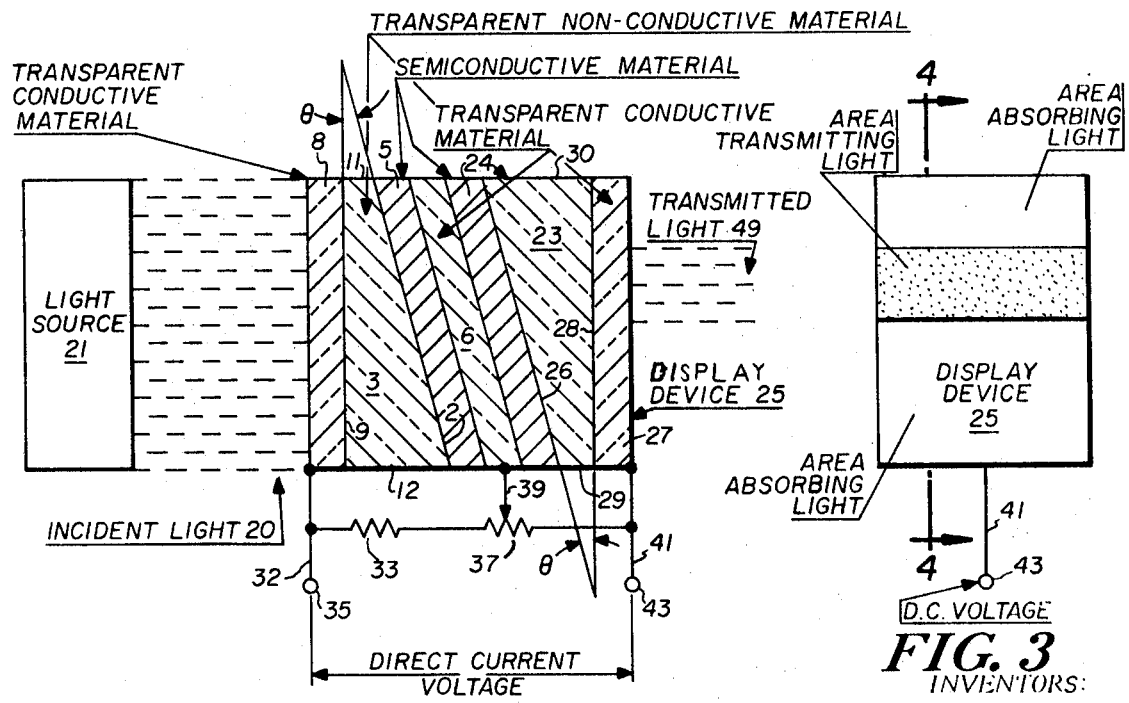

DISPLAY DEVICE WITH UNIFORMLY DECREASING ELECTRIC FIELD

CROSS-REFERENCE TO RELATED APPLICATIONS

This application is a continuation as to all subject matter common to U.S. application Ser. No. 706,566 filed Feb. 19, 1968, and now abandoned, by Walter W. Lee and Milton Genser and assigned to The Bendix Corporation, assignee of the present invention, and a continuation-in-part for all additional subject matter.

BACKGROUND OF THE INVENTION

1. Field of the Invention

This invention relates to visual display devices and, more particularly, to a solid-state visual display device.

2. Description of the Prior Art

Heretofore, solid-state visual display devices, in which the edge of an optical absorption band of a semiconductive material was shifted to control the transmission of light having a wavelength related to the optical absorption band, such as that disclosed in U.S. Pat. No. 3,025,763 granted Mar. 20, 1962 to R. S. Schwartz et al. in which the material either transmitted or absorbed all the light in response to temperature change. However, in the Schwartz device the means provided could not selectively transmit only a portion of the light.

The present invention shifts the edge of the optical absorption band by establishing an electric field across the semiconductive material that uniformly decreases in strength so that a portion of the semiconductive material absorbs the light simultaneously with another portion of the semiconductive material transmitting light. By increasing or decreasing the strength of the electric field, the areas of the transmitting and absorbing portions of the semiconductive material are controlled to provide a meaningful display.

The present invention further differs from the Schwartz device by using a plurality of layers of the semiconductive material and by establishing separate electric fields across each semiconductive material layer to provide a lighted display having a variable cross-sectional area and a variable location. Each electric field uniformly decreases in strength along a semiconductive material layer. The cross-sectional area of the transmitted light and the location can be changed by changing any, or all, of the electric fields.

U.S. Pat. No. 3,060,345 issued to E. A. Sack, Jr., on Oct. 23, 1962 shows a display device in which a nonconductive material having surfaces at angular positions to each other is disclosed. The device of the Sack patent does not utilize the angular relationship of the surfaces to uniformly decrease the strength of an electric field across a semiconductive material. An electroluminescent phosphor has voltages applied across it by two electrodes. The voltage appearing on one electrode is conducted through the nonconductive material irrespective of the angular relationship of the surfaces of the nonconductive material, so that the voltage across the phosphor due to the electrodes is constant and does not create an electric field decreasing uniformly in strength.

U.S. Pat. No. 3,070,701 issued to M. Wasserman on Dec. 25, 1962 discloses an electroluminescent device having electrode strips which permits different voltages to be applied across a photoconductive layer. The Wasserman patent and the Sack patent in combination does not disclose nor suggest a device in which an electric field is established across a semiconductive material that uniformly decreases in strength.

SUMMARY OF THE INVENTION

A display device for transmitting light to provide a lighted display wherein one embodiment of the invention includes a display device receiving light of a particular wavelength and the device has a first layer of semiconductive material with an optical absorption band related to the wavelength of the light and the edge of the optical absorption band shifts in the presence of an electric field. Means is connected to the semiconductor material layer for establishing an electric field across the semiconductive material layer and the electric field uniformly decreases in strength in one direction along the first layer of semiconductive material. The strength of the electric field is changed to cause a portion of the semiconductive material to absorb the light while another portion of the semiconductive material is transmitting the light to provide the lighted display. The size of the areas of the transmitting and absorbing portions of the semiconductive material are controlled by changing the strength of the electric field.

A second embodiment of the present invention uses a second layer of semiconductive material, arranged with the first layer and subjected to a second electric field, to provide a band of transmitted light to effect the lighted display. The strength of the second electric field uniformly decreases in strength along the second layer of semiconductive material in a direction opposite to the direction of the decrease in strength of the first electric field along the first layer of semiconductive material. The strengths of the electric fields may be changed simultaneously to change the position of the band of transmitted light, or changed separately to affect the width of the band of transmitted light.

A third embodiment of the present invention uses third and fourth layers of semiconductive material arranged in the same manner as the first and second layers and rotated 90° around an axis passing through the first and second layers of semiconductive material. Different electric fields are established across the third and fourth semiconductive material layers similar to the electric fields established across the first and second semiconductive material layers so that an area transmitting light is created across the fourth semiconductive material layer that is perpendicular to the area transmitting light across the first and second layers, so as to pass a column of light whose cross-sectional area may be changed and whose position may be changed by changing the strengths of the electric fields across all four layers of semiconductive material.

One object of the present invention is to provide a lighted display which is controlled by an electric field that uniformly decreases in strength with distance.

Another object of the present invention is to provide a display device using low voltages during operation.

Another object of the present invention is to provide a display system providing a band of light whose width and position may be changed to provide the display.

Another object of the present invention is to provide a display system providing a column of light whose cross-sectional area and position may be changed to provide the display.

These and other objects and advantages of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE DRAWINGS

FIG. 1 shows a novel display device constructed in accordance with the present invention for transmitting light in response to control voltages.

FIG. 2 shows a light source and a cross-sectional view of the display device of FIG. 1, taken along the line 2-2 and looking in the direction of the arrows, partially transmitting light that it receives from the light source to provide a lighted display.

FIG. 3 shows another display device constructed in accordance with the present invention for transmitting a band of light which may be positioned in accordance with applied control voltages.

FIG. 4 shows a light source and a cross-sectional view of the display device of FIG. 3, taken along the line 4-4 and looking in the direction of the arrows, providing a lighted display.

DESCRIPTION OF THE INVENTION

Figure 5:
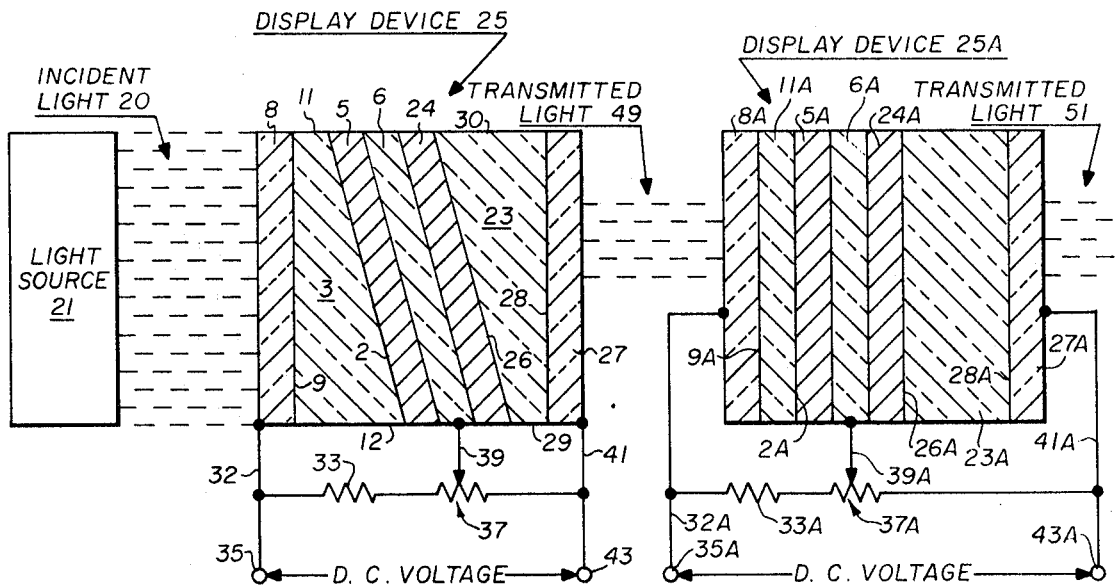
FIG. 5 shows a display system in which two display devices of the type shown by FIGS. 3 and 4 are arranged to transmit a small column of light which may be positioned in accordance with the applied voltages.

The basis of the present invention is the Franz-Keldysh effect. This effect is the shift of the edge of an optical absorption band of a semiconductor material such as cadmium sulfide in the presence of a strong electric field. The shift of the edge of an optical absorption band of a semiconductive material due to an electric field is discussed in an article Optical Absorption in the Presence of a Uniform Field, by K. Tharmalingam, at page 2,204, of PHYSICAL REVIEW volume 130, No. 6, published June 15, 1963.

Typically, if such a semiconductor, such as cadmium sulfide, normally absorbs all radiation below 5,100 angstrom units; in the presence of a strong electric field, it will absorb all radiation below 5,200 angstrom units. Thus, if light of 5,100 angstrom wavelength is incident on one side of a thin film of cadmium sulfide it will be absorbed if an electric field strength $F$ is greater than a critical electric field strength $F_c$ and transmitted only if the electric field strength $F$ is less than the critical electrical field strength $F_c$.

Referring to FIGS. 1 and 2, there is shown a display device 1 having a supporting member 3 of transparent nonconductive material having surfaces 2, 9, 11 and 12. Surfaces 2 and 9 of member 3 are spacially related to each other by an angle $\theta$. Surface 11 is located where surfaces 2 and 9 are closest together, while surface 12 is located where surfaces 2 and 9 are furthest apart. Angle $\theta$ assures that when an electric field is established across supporting member 3, as hereinafter explained, it will decrease in strength uniformly from surface 11 to surface 12 due to the increasing distance between surfaces 2 and 9 of member 3. A layer 5 of semiconductive material, such as cadmium sulfide, is affixed to surface 2, although it may be affixed to surface 9. Layers 6 and 8 of transparent conductive material, for example tin oxide, are affixed to layer 5 of semiconductive material and to surface 9 of supporting member 3, respectively.

Conductors 14 and 17 connect layers 6 and 8 to terminals 15 and 18, respectively. A direct current voltage is applied to terminals 15 and 18 causing layers 6 and 8 of transparent conductive material to establish an electric field across supporting member 3 and layer 5 of semiconductive material. The electric field is strongest near surface 11 of member 3 and decreases uniformly in strength until the electric field is at its weakest near surface 12. A light source 21 provides light 20, having a wavelength of 5,100 angstrom units, incident upon layer 8 of display device 1 which transmits some of the light 20 as hereinafter explained.

The electric field uniformly decreases in strength from surface 11 of display device 1 to surface 12 due to the increasing distance between surfaces 2 and 9. The electric field across layer 5 of semiconductive material at any selected point is given by $$F = v/d \quad (1)$$

where $F$ is the electric field strength, $v$ is the amplitude of the applied direct current voltage and $d$ is the distance between surfaces 2 and 9 at the selected point. When angle $\theta$ is very small, field strength $F$ of equation (1) may be rewritten as $$F = V/H\theta \quad (2)$$

where $H$ is the distance from surface 11 along surface 9 and $\theta$ is the angle of relationship of surfaces 2 and 9 to each other as shown in FIG. 2.

When $F$ is greater than the electric field strength $F_c$ required to shift the edge of the optical absorption band, then no light is transmitted. When $F$ is less than the critical electric field strength $F_c$, light is transmitted. The distance $H$ from surface 11, where the transition from transmitting light 20 to absorbing light 20 takes place, is $$H = V/\theta F_c \quad (3)$$

It the voltage $v$ is initially so large that the distance $H$ is longer than the distance between surfaces 11 and 12 of supporting member 3, no light will be transmitted by the display device 1. As voltage $v$ is gradually decreased, the area transmitting light 20, shown in FIG. 1, will increase. The amplitude of the direct current voltage applied to terminals 15 and 18 controls the strength of the electric field and hence controls the size of area of display device 1 transmitting light 20.

Referring to FIGS. 3 and 4, FIG. 3 shows a display device 25 having a constant width transmitting area which may be positioned, as hereinafter explained. Display device 25 essentially comprises two display devices of a type referred to by numeral 1 of FIG. 2 and so that their absorption areas cancel out part of the transmitting areas of each other leaving a transmitting area across a face of the display device 25 transmitting light as shown in FIG. 3 and as hereinafter explained.

Referring to FIG. 4, supporting member 3 and layers 5, 6 and 8 of display device 25 are identical and are arranged in the same manner as similarly identified member and layers of display device 1 of FIG. 2. Moreover, as shown by FIG. 4, a layer 24 of semiconductive material similar to the semiconductive material used in layer 5 is affixed to layer 6. A second supporting member 23 identical in form to supporting member 3 having surfaces 26, 28, 29 and 30 corresponding to surfaces 2, 9, 11 and 12, respectively, of member 3 is arranged so that surface 26 is next to layer 24 of semiconductive material and surfaces 29 and 30 are in the same planes as surfaces 12 and 11, respectively. With the arrangement of supporting members 3 and 23 heretofore described, when separate electric fields are established across both members, as hereinafter described, the electric field across member 3 will uniformly decrease in strength while moving towards surface 12, while the electric field across member 23 will increase in strength moving towards surface 29 which is in the same plane as surface 12 of member 3.

A layer 27 of transparent conductive material similar to the material in layer 6 is affixed to surface 28 of supporting member 23. Conductors 32 and 41 connect terminals 35 and 43, respectively, to layers 8 and 27, respectively, of transparent conductive material. A resistor 33 is connected to conductor 32 and a potentiometer 37, having a movable arm 3, connects conductor 41 to resistor 33 and movable arm 39 is connected to layer 6 of transparent conductive material.

A direct current voltage is applied to terminals 35 and 43. Resistor 33 and potentiometer 37 acts as a voltage divider to apply one voltage across layers 6 and 8 of conductive material to establish an electric field across layer 5 of semiconductive material and supporting member 3, and to apply a second voltage across layers 6 and 27 of conductive material, to establish an electric field across layer 24 of semiconductive material, and supporting member 23. The strengths of the electric fields are changed by moving arm 39 of potentiometer 37. Light source 21 applied light 20 to layer 8 of display device 25.

Since one electric field is increasing in strength while the other electric field is decreasing in strength uniformly from surfaces 11 and 30 of members 3 and 23 as heretofore explained, the transmitting area of layer 5 of semiconductive material is opposite the absorbing area of layer 24 of semiconductive material so that some light transmitted by layer 5 is absorbed by layer 24. The strength of the electric fields are such that a layer of semiconductive material absorbing some of the light 20 due to one electric field is less than the area transmitting some of the light 20 due to the other electric field so that a band of light 49 is transmitted by display device 25. The width of the band of light 49 is controlled by the value of resistance of resistor 33 and the position of the band of light 49 may be changed by moving arm 39 of potentiometer 37.

Figure 6:
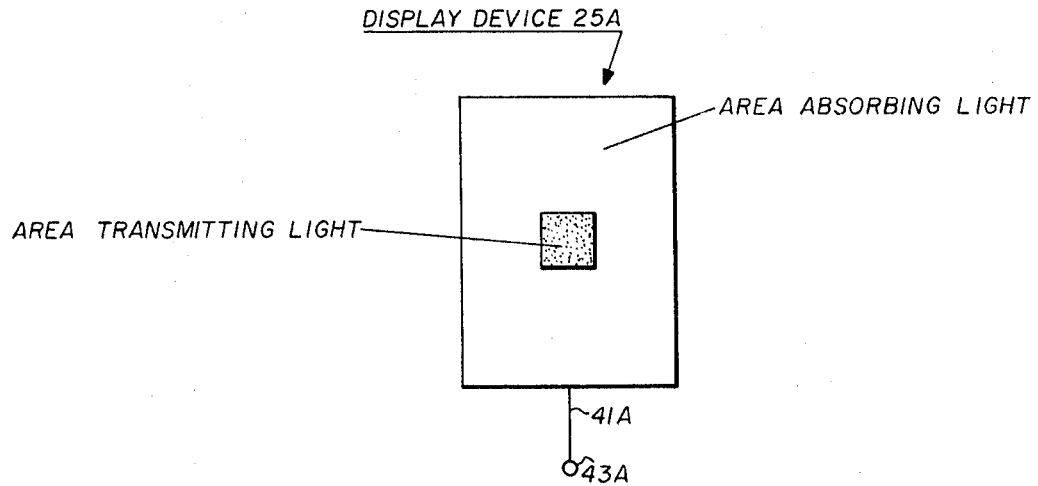
FIG. 6 shows one face of the display device displaying the column of light in FIG. 5.

Referring to FIGS. 5 and 6, there is shown a display system in which light source 21 applies incident light 20 to a display device 25 receiving a direct current voltage, which passes band of light 49 as heretofore described. Transmitted light 49 is incident upon a second display device 25A having corresponding parts, identified with corresponding numerals having the suffix A, and receiving another direct current voltage.

Display device 25A is rotated 90° about an axis passing through light source 21 and display device 25 so that the transmitting area of display device 25A is perpendicular to the transmitting area of display device 25 resulting in a portion of light 49 being transmitted by display device 25A as light 51. Transmitted light 51 has a rectangular cross section as shown by the transmitting area of display device 25A in FIG. 6. The area of light 51 is determined by the resistance values of resistors 33 and 33A. The position of the transmitted light 51 may be changed by moving the arms 39 and 39A of potentiometers 37 and 37A, respectively.

While three embodiments of the invention have been illustrated and described, various changes in the form and relative arrangement of the parts which will now appear to those skilled in the art may be made without departing from the scope of the invention. Reference is, therefore, to be had to the appended claims for a definition of the limits of the invention.

We claim:

1. A device for effecting a display upon receiving a light of a particular wavelength, said display device comprising a first layer of semiconductive material with an optical absorption band related to the wavelength of the light and the first layer of the semiconductive material being a type in which an edge of the optical absorption band shifts in the presence of an electric field to absorb the light so as to affect the transmission of light by the semiconductive material of said first layer, a first electrically conductive transparent layer positioned in a spaced relation to the first semiconductive layer, first means connected to the first semiconductive layer, first means connected to the first semiconductive layer and the first electrically conductive transparent layer for establishing a first electric field across the first semiconductive material layer, and the first semiconductive layer extending in a predetermined acute angular spaced relation to the first electrically conductive transparent layer so that the first electric field uniformly decreases in strength in an inverse relation to said spaced relation between the first electrically conductive layer and the first semiconductive layer so as to cause a shift in one sense in the optical absorption band along the semiconductive material layer to effect the display, and means connected to the first electric field means for changing the strength of the electric field to variably control the transmission of light by the first semiconductive material layer to affect the display.

2. The device defined by claim 1 including a second layer of semiconductive material with an optical absorption band related to the wavelength of the light and the second layer of the semiconductive material being of a type in which an edge shifts in the presence of an electric field, a second transparent electrical conductive layer being positioned in an intermediate adjacent relation to the first and second layers of said semiconductive material so that the second layer will receive the light transmitted by the first layer of semiconductive material so that the second layer will receive the light transmitted by the first layer of semiconductive material, and in which the first means connected to the first semiconductive layer for establishing the first electric field includes the second transparent electrical conductive layer, and other means connected to the second semiconductive material layer and including a third transparent electrical conductive layer positioned in a spaced relation to the second semiconductive layer for establishing a second electric field across the second layer of semiconductive material, and the second semiconductive layer extending in a predetermined acute angular spaced relation to said third transparent electrical conductive layer so that the strength of the second electric field uniformly decreases in an inverse relation to said spaced relation between said third electrically conductive layer and the second semiconductive layer so as to cause a shift in another sense in the optical absorption band along the second semiconductive layer so as to cause the second layer of the semiconductive material to absorb some of the light transmitted by the first layer of semiconductive material to display a band of light having a width determined by the relationship of the first and second-mentioned electric fields to each other, and the means for changing the strength of the first mentioned of said electric fields including means to change the strength of the second of said electric fields to vary the width of the band of transmitted light and to change the position of the band of light.

3. A display device of the kind described in claim 2, further comprising a third layer of a semiconductive material with an optical absorption band related to the wavelength of the light and the third layer of the semiconductive material being of a type in which an edge of the optical absorption band shifts in the presence of an electric field to absorb the light so as to affect the transmission of light by the semiconductive material of said third layer, a fourth electrically conductive transparent layer positioned in a spaced relation to the third semiconductive layer, third means connected to the third semiconductive layer and the fourth electrically conductive transparent layer for establishing a third electric field across the third semiconductive material layer, and the third semiconductive layer extending in a predetermined acute angular spaced relation to the fourth electrically conductive transparent layer so that the third electric field uniformly decreases in strength in an inverse relation to said spaced relation between the fourth electrically conductive layer and the third semiconductive layer so as to cause a shift in one sense in the optical absorption band along the third semiconductive material layer, means connected to the third means for establishing the third electric field for changing the strength of the third electric field to variably control the transmission of light by the third semiconductive material layer; a fourth layer of semiconductive material with an optical absorption band related to the wavelength of the light and the fourth layer of the semiconductive material being of a type in which an edge shifts in the presence of an electric field, a fifth transparent electrical conductive layer being positioned in an intermediate adjacent relation to the third and fourth layers of said semiconductive material so that the fourth layer will receive the light transmitted by the third layer of semiconductive material, and in which the third means connected to the third semiconductive layer for establishing the third electric field includes the fifth transparent electrical conductive layer, and fourth means connected to the fourth semiconductive material layer and including a sixth transparent electrical conductive layer positioned in a spaced relation to the fourth semiconductive layer for establishing a fourth electric field across the fourth layer of semiconductive material, and the fourth semiconductive layer extending in a predetermined acute angular spaced relation to said sixth transparent electrical conductive layer so that the strength of the fourth electric field uniformly decreases in an inverse relation to said spaced relation between said sixth electrically conductive layer and the fourth semiconductive layer so as to cause a shift in another sense in the optical absorption band along the fourth semiconductive layer so as to cause the fourth layer of the semiconductive material to absorb some of the light transmitted by the third layer of semiconductive material; and the third and fourth layers of said semiconductive material being arranged so that light transmitted by the first and second semiconductive material layers may be incident on one of the third and fourth semiconductive material layers, said first and second layers of semiconductive material providing first effective axes along which the edges of the optical absorption bands thereof shift in said one and other senses and the third and fourth layers of semiconductive material providing second effective axes along which the edges of the optical absorption bands thereof shift in said one and other senses, the first effective axes along which the edges of the optical absorption bands thereof shift in said one and other senses, the first effective axes of the first and second semiconductive material layers extending in a 90° angular relation to the second effective axes of the third and fourth layers of semiconductive material; and in which the third and fourth electric field establishing means connected to the third and fourth semiconductive material layers establish the third and fourth electric fields across the third and fourth semiconductive layers, respectively, so that the third electric field across the third semiconductive material layer uniformly decreases in strength along the second effective axes of the third semiconductive layer in one direction that is spacially related to change in field strengths of the first and second electric fields along the first effective axes of the first and second semiconductive layers, while the fourth electric field uniformly decreases in strength along the second effective axis of the fourth semiconductive layer in a direction opposite to the direction of the decrease in strength of the third electric field along the second effective axis of the third semiconductor layer so that the band of light transmitted by the first and second semiconductive material layers is partially absorbed by the third and fourth semiconductive layers to cause a column of light to be transmitted; and the means for changing the strength of the electric fields being effective to change the cross-sectional area of the column of light and to change the position of the column of light.

4. The display device defined by claim 1 including a transparent nonconductive member for positioning the first-mentioned electrically conductive transparent layer in said spaced relation to the first semiconductive layer, the transparent nonconductive member having opposite side surfaces spacially related to each other, said side surfaces extending in said predetermined acute angular spaced relation one to the other, the first semiconductive layer having a side surface positioned on one of the side surfaces of the transparent nonconductive member, the first transparent conductive layer being positioned on the opposite side surface of the transparent nonconductive member in said predetermined acute angular spaced relation to the first semiconductive layer; a second layer of a transparent conductive material affixed to an opposite side surface of the first semiconductive layer and extending in parallel relation to said first semiconductive layer; and the first field-establishing means being connected to the first and second conductive material layers for applying a direct current voltage across the first and second conductive layers to establish the first electric field, the strength of the first electric field being variable directly in accordance with the applied direct current voltage and in inverse relation with the variable distance between the first semiconductive layer and the first conductive layer positioned on said opposite surfaces of the transparent nonconductive member in said acute angular spaced relation so as to cause a shift in the edge of the optical absorption band of the first semiconductive layer into a variable portion of the first semiconductive layer in which the electric field exceeds a predetermined critical strength resulting in the incident light being absorbed by that portion of the first semiconductive layer while the incident light may be effectively transmitted by a remaining portion of the first semiconductive layer in which the first electric field is not of said critical strength sufficient to shift the edge of the optical absorption band into said remaining portion of the first semiconductive layer.

5. A display device of the kind described in claim 4 further comprising a second layer of semiconductive material with an optical absorption band related to the wavelength of the light and the second layer of the semiconductive material being of a type in which an edge shifts in the presence of an electric field, the strength semiconductive layer being arranged adjacent to the first transparent conductive layer; and a second transparent nonconductive member having opposite side surfaces spacially related to each other and arranged with one of said side surfaces adjacent to the second semiconductive layer, said side surfaces extending in said predetermined acute angular spaced relation one to the other, a third layer of the transparent conductive material affixed to the other side surface of the second transparent nonconductive member; and second means connected to the first and third transparent conductive layers for applying a second direct current voltage across the first and third transparent conductive layers creating a second electric field, whose strength varies in accordance with the second applied direct current voltage and with the distance between the opposite side surfaces of the second transparent nonconductive member to cause a shift in the edge of the optical absorption band of the second semiconductive layer effectively into a variable portion of the first semiconductive layer in which the electric field exceeds a predetermined critical strength resulting in some of the light transmitted by the first semiconductive layer being absorbed by that portion of the second semiconductive layer where the shift of the edge occurred, while the remainder of the transmitted light from the first semiconductive layer is transmitted by a remaining portion of the second semiconductive layer in which the electric field is not of said critical strength sufficient to shift the edge of the optical absorption band so that a band of light is transmitted by the semiconductive layers; and means to control the amplitudes of the direct current voltages to change the strength of the first and second electric fields to change the width of the band of light and to change the position of the band of light.

6. A display device of the kind described in claim 5 in which the changing means includes a pair of terminals receiving a direct current voltage, a resistor connected to one terminal, and a variable resistor, having a movable arm, connected to the resistor and to the other terminal to form a voltage divider circuit to provide the first and second direct current voltages in response to the received direct current voltages in response to the received direct current voltage applied to the terminals; and the means to control the amplitudes of the first and second direct current voltages including first means connected to one terminal and to the movable arm of the variable resistor to apply the first direct current voltage across the first and second transparent conductive material layers, and a second means connected to the other terminal and to the movable arm of the variable resistor to apply the second direct current voltage across the second and third transparent conductive material layers.

7. A device for providing a display upon receiving a light of a particular wavelength, comprising first and second semiconductive means, first electrically conductive transparent means positioned intermediate the first and second semiconductive means in electrical contacting relation with said first and second semiconductive means, second and third electrically conductive transparent means, transparent nonconductive means for positioning the first semiconductive means in a predetermined acute angular spaced relation to the second electrically conductive transparent means and the second semiconductive means in a predetermined acute angular spaced relation to the third electrically conductive transparent means, both the first and second semiconductive means having an optical absorption band related to the wavelength of the light in which an edge of the optical absorption band may be effectively shifted by an electric field so as to absorb the light, first means connected to the first and second electrically conductive transparent means to establish a first electric field across the first semiconductive means so as to cause a shift in one sense in the optical absorption band of the first semiconductive means, second means connected to the first and third electrically conductive transparent means to establish a second electric field across the second semiconductive means so as to cause a shift in an opposing sense in the optical absorption band of the second semiconductive means to vary the transmission of the light through the first and second semiconductive means for providing the display.

8. The device defined by claim 7 including third and fourth semiconductive means, fourth electrically conductive transparent means positioned intermediate the third and fourth semiconductive means in electrical contacting relation with said third and fourth semiconductive means fifth and sixth electrically conductive transparent means, another transparent nonconductive means for positioning the third semiconductive means in a predetermined acute angular spaced relation to the fifth electrically conductive transparent means and the fourth semiconductive means in a predetermined acute angular spaced relation to the sixth electrically conductive transparent means, both the third and fourth semiconductive means having an optical absorption band related to the wavelength of the light in which an edge of the optical absorption band may be effectively shifted by an electric field so as to absorb the light, third means connected to the fourth and fifth electrically conductive transparent means to establish a third electric field across the third semiconductive means so as to cause a shift in one sense in the optical absorption band of the third semiconductive means, second means connected to the fourth and sixth electrically conductive transparent means to establish a fourth electrical field across the fourth semiconductive means so as to cause a shift in an opposing sense in the optical absorption band of the fourth semiconductive means, the first and second semiconductive means having a first effective axes along which the edges of the optical absorption bands thereof may be shifted in the one and opposite senses, and the third and fourth semiconductive means having second effective axes along which edges of the optical absorption bands thereof may be shifted in the one and opposite senses, the first effective axes of the first and second semiconductive means extending in a predetermined angular relation to the second effective axes of the third and fourth semiconductive means so that light transmitted through the first and second semiconductive means may be incident on one of the third and fourth semiconductive means so that the third and fourth semiconductive means may be thereby effective to vary the transmission of the light through the first and second semiconductive means for providing the display.